(12) United States Patent
Baabdallah

(10) Patent No.: US 11,057,348 B2
(45) Date of Patent: Jul. 6, 2021

(54) METHOD FOR DATA CENTER NETWORK SEGMENTATION

(71) Applicant: Saudi Arabian Oil Company, Dhahran (SA)

(72) Inventor: Abdallah M Baabdallah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 189 days.

(21) Appl. No.: 16/548,305

(22) Filed: Aug. 22, 2019

(65) Prior Publication Data

US 2021/0058371 A1   Feb. 25, 2021

(51) Int. Cl.
*H04L 29/06* (2006.01)

(52) U.S. Cl.
CPC ...... *H04L 63/0263* (2013.01); *H04L 63/0272* (2013.01); *H04L 63/1408* (2013.01)

(58) Field of Classification Search
CPC ............. H04L 63/0263; H04L 63/0272; H04L 63/1408; H04L 41/04; H04L 63/0227; H04L 63/0209
See application file for complete search history.

(56) References Cited

U.S. PATENT DOCUMENTS

| | | | |
|---|---|---|---|
| 9,143,442 B2 | 9/2015 | Yang et al. | |
| 9,575,798 B2 | 2/2017 | Terayama et al. | |
| 9,832,136 B1 | 11/2017 | Gibson | |
| 10,771,506 B1* | 9/2020 | Kumar | H04L 63/1433 |
| 2011/0261828 A1 | 10/2011 | Smith | |
| 2014/0164619 A1 | 6/2014 | Zhu et al. | |
| 2014/0208319 A1 | 7/2014 | Yoshimura et al. | |

(Continued)

FOREIGN PATENT DOCUMENTS

WO    2018/024809    2/2018

OTHER PUBLICATIONS

International Search Report and Written Opinion in Corresponding PCT Application No. PCT/US2020/046592 dated Oct. 6, 2020. 13 pages.

*Primary Examiner* — Cheng-Feng Huang
(74) *Attorney, Agent, or Firm* — Leason Ellis LLP

(57) ABSTRACT

A method for data center network segmentation is provided. The data center network segmentation is for a hybrid environment including physical servers and appliances as well as virtual servers and appliances. The data center network segmentation uses software-defined networking (SDN) technology of physical SDN-ready servers/appliances and virtual SDN-ready servers/appliances. The method includes centralizing the management of network security policies for physical and virtual firewalls. The method includes using SDN to direct network traffic between physical servers through physical firewalls, and to direct network traffic between virtual servers through virtual firewalls. The method further includes using the SDN to direct network traffic from physical servers to virtual servers through physical firewalls, and to direct network traffic from virtual servers to physical servers through virtual firewalls. A firewall management device monitors activity of the physical and virtual firewalls, and adjusts a firewall management policy in response to the monitored activity.

12 Claims, 2 Drawing Sheets

(56) References Cited

U.S. PATENT DOCUMENTS

| | | | |
|---|---|---|---|
| 2015/0222598 A1* | 8/2015 | Koponen | G06F 9/45533 726/13 |
| 2015/0326532 A1* | 11/2015 | Grant | H04L 63/0263 726/1 |
| 2016/0191463 A1* | 6/2016 | Mohanty | H04L 41/0803 726/11 |
| 2016/0203528 A1 | 7/2016 | Saha et al. | |
| 2018/0034781 A1* | 2/2018 | Jaeger | H04L 63/20 |
| 2018/0083837 A1* | 3/2018 | Teng | H04L 41/046 |
| 2018/0131675 A1* | 5/2018 | Sengupta | H04L 63/0263 |
| 2019/0349404 A1* | 11/2019 | Jain | H04L 67/10 |

\* cited by examiner

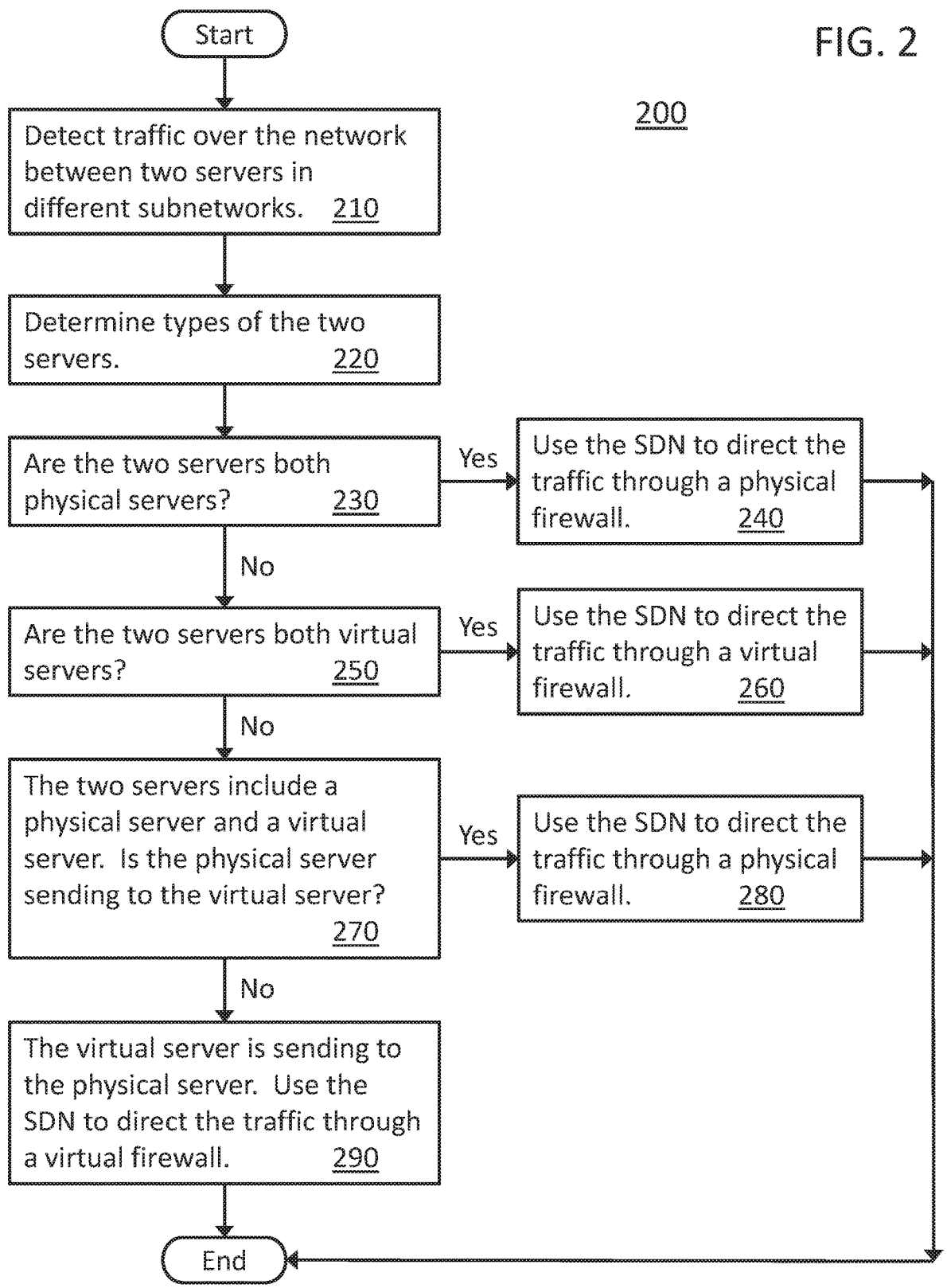

METHOD FOR DATA CENTER NETWORK SEGMENTATION

FIELD OF THE DISCLOSURE

The present disclosure relates to a method, firewall management device, and computer-readable medium (CRM) for data center network segmentation.

BACKGROUND OF THE DISCLOSURE

Data center network segmentation is the process of splitting a data center computer network into two or more subnetworks (or network segments). This can reduce network congestion and improve network security of the data center. It can also segregate portions of the data center from appearing to share the same resources, such as by putting each such portion in its own virtual local area network (VLAN). Data centers are made up of servers, both physical (such as bare metal) and virtual (such as a virtual machine running on a hypervisor-equipped host machine). Network traffic within a data center is referred to as "east-west traffic," while network traffic between the data center and anywhere outside the data center is referred to as "north-south traffic."

Firewalls are network security systems that monitor and control incoming and outgoing network traffic based on the data center's security rules. Firewalls can provide network security for both east-west traffic and north-south traffic. Firewalls can be physical or virtual. Example physical firewalls include physical network firewalls (between networks or subnetworks) and physical host-based firewalls (between a network and a physical server hosting the firewall). Example virtual firewalls include network firewall services or appliances running in virtualized environments. Part of data center network segmentation includes attending to the physical and virtual firewalls that secure the network segments of the data center. For example, deciding what type of firewall (physical or virtual) to use and when can present challenges to data center network segmentation.

It is with respect to these and other problems in the art that the present disclosure is directed to provide a technical solution for effective management of physical and virtual firewalls in data center network segmentation.

SUMMARY OF THE DISCLOSURE

Embodiments of the present disclosure provide a method for network segmentation of a data center. The data center includes servers of different types, including physical and virtual servers. The data center further includes physical and virtual firewalls managed by a firewall management device. The data center also includes a network configured to connect the servers using software-defined networking (SDN). The method is carried out by the firewall management device. The method includes detecting traffic over the network between two servers in different subnetworks from among the physical and virtual servers, and determining the types of the two servers (physical and/or virtual).

In response to determining the two servers are physical, the method further includes using the SDN to direct the traffic through one of the physical firewalls. In response to determining the two servers are virtual, the method further includes using the SDN to direct the traffic through one of the virtual firewalls. In response to determining the two servers include a physical server and a virtual server, in which the traffic comprises the physical server sending information to the virtual server, the method further includes using the SDN to direct the traffic through one of the physical firewalls. In response to determining the two servers include the physical server and the virtual server, in which the traffic comprises the virtual server sending information to the physical server, the method further includes using the SDN to direct the traffic through one of the virtual firewalls.

In another aspect, when the physical server sends information to the virtual server, the traffic is directed through one of the virtual firewalls, and when the virtual server sends information to the physical server, the traffic is directed through one of the physical firewalls. In such a scenario, the virtual firewall is protecting the virtual server, and the physical firewall is protecting the physical server.

According to another aspect, a firewall management device for network segmentation of the data center is provided. The firewall management device includes hardware and/or software logic to carry out the method for network segmentation. According to yet another aspect, a non-transitory computer-readable medium (CRM) is provided. The CRM stores instructions that, when executed on a computer processor of a firewall management device, cause the firewall management device to carry out the method for network segmentation of the data center.

These and other aspects and features can be appreciated from the following description of certain embodiments of the disclosed invention and the accompanying drawings and claims.

BRIEF DESCRIPTION OF THE DRAWINGS

FIG. 2 is a flow chart of an embodiment method for data center network segmentation, such as for the data center of FIG. 1, according to the present disclosure.

DETAILED DESCRIPTION OF CERTAIN EMBODIMENTS OF THE DISCLOSURE

Figure 1:
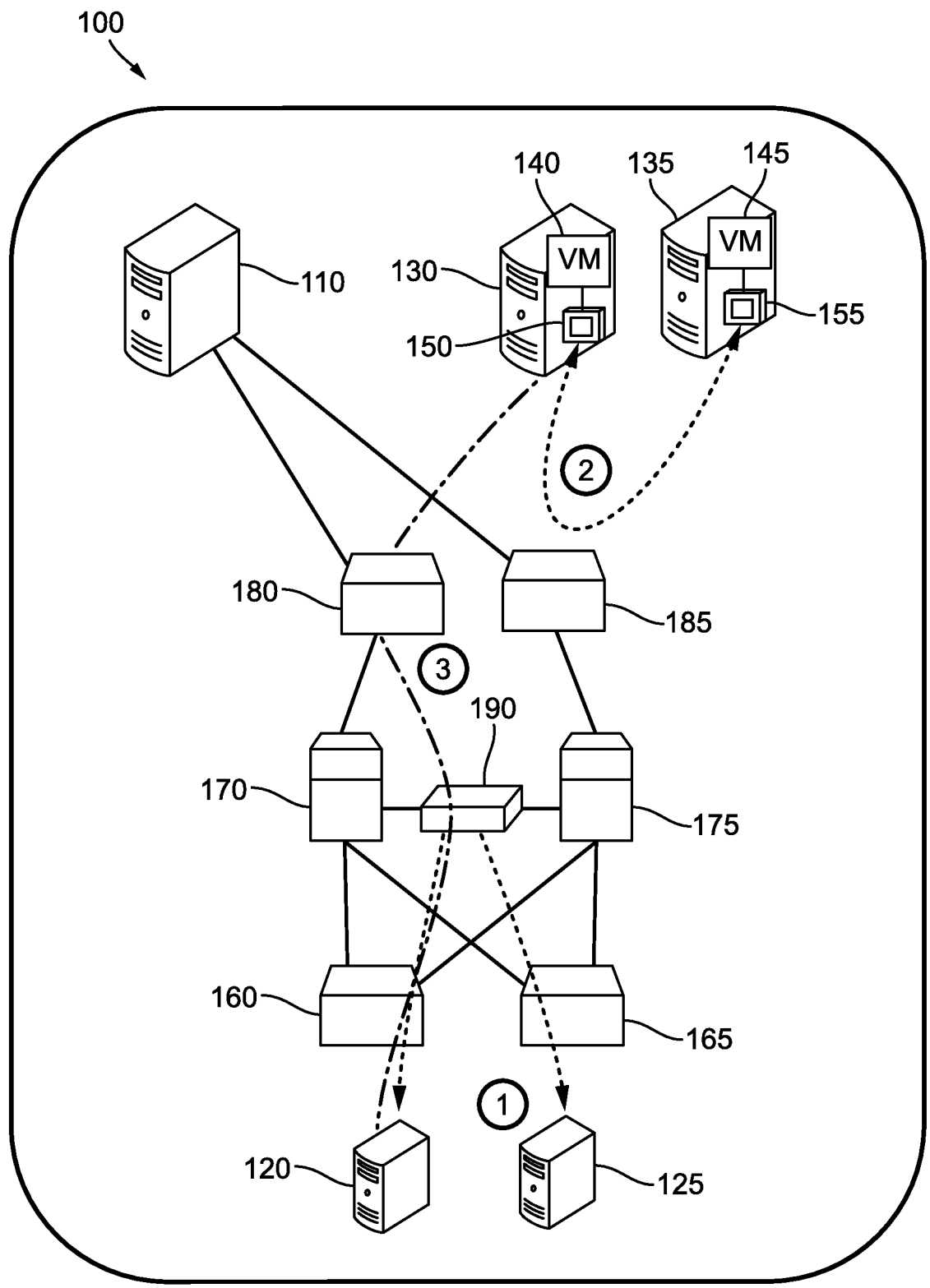
FIG. 1 is a schematic block diagram showing an example data center in which embodiments of the present disclosure can be employed.

Disclosed herein are a method, a firewall management device, and a computer-readable medium (CRM) for data center network segmentation. The method implements data center network segmentation for a physical/virtual hybrid computing environment including physical servers and/or appliances as well as virtual servers and/or appliances. Throughout, physical entities and virtual entities are referred to as entities of different "types." The method uses software-defined networking (SDN) technology of both physical SDN-ready servers/appliances and virtual SDN-ready servers/appliances. The method includes centralizing the management of network security policies for both physical and virtual firewalls. For ease of description, the term "server" will be used throughout to refer to any computing device such as a traditional server or computing appliance. A "physical server" will refer to such a computing device that is implemented in dedicated physical hardware, such as a bare-metal server or a physical firewall appliance. Likewise, a "virtual server" will refer to such a computing device that is implemented in software as a virtual machine running on a hypervisor of a host server.

In an embodiment, SDN technology provides network segmentation within the data center to split the network into subnetworks, and segment the east-west traffic between subnetworks. East-west traffic includes the network traffic between the servers that make up the data center. SDN is a centrally-managed programmable network architecture that dynamically adjusts to network traffic. SDN physically separates the network control plane (that is responsible for routing the network traffic) from the forwarding plane (that is responsible for moving the network traffic).

This enables the network control to become directly programmable and the underlying infrastructure to be abstracted for applications and network services.

Data centers include different types of servers, including physical servers and virtual servers. The physical servers include, for example, bare-metal servers, network-attached storage (NAS) systems, and converged physical appliances, to name a few. In an embodiment, a method performs data center network segmentation for a data center environment including both physical and virtual servers. The method uses SDN and hypervisor virtualization technologies. Both these technologies can use the same kind of firewall. However, some of these firewalls are physical and some are virtual. In an example embodiment, there are one or two physical firewalls along with multiple virtual firewalls, one in every host server that can be integrated with the hypervisor. In an embodiment, a synchronization between all the firewalls (physical and virtual) is made to allow the sessions to update. This can be especially useful in cases such as stateful firewalls that maintain tables of allowable or active connections.

FIG. 1 is a schematic block diagram showing an example data center 100 in which embodiments of the present disclosure can be employed. The data center 100 can include the computing resources of a business location, such as all or part of a building or multiple buildings. The data center 100 includes bare-metal servers 120 and 125, which are single-tenant physical servers. The data center 100 further includes hypervisor (or host) servers 130 and 135, each running one or more virtual machines or servers. The virtual machines include virtual server 140 running on host server 130 and virtual server 145 running on host server 135. The physical or host servers can include one or more processors or microprocessors, memory such as random-access memory (RAM), non-transitory storage such as disk drives, and software or firmware to be executed by the processors using the memory, all of which are conventional and none of which are illustrated, but which should be understood to be part of the servers and devices being illustrated.

The servers of the data center 100 are interconnected with a network (such as for use with packet switching) that includes leaf switches 160 and 165, spine switches 170 and 175, and leaf switches 180 and 185. The leaf switches aggregate traffic from server nodes (e.g., each server being connected to one leaf switch) and connect to the core of the network (e.g., the spine switches). In FIG. 1, leaf switches 160 and 165 aggregate traffic from bare-metal servers 120 and 125, while leaf switches 180 and 185 aggregate traffic from virtual servers 140 and 145 (i.e., host servers 130 and 135). Spine switches 170 and 175 aggregate traffic from all the leaf switches. The network is split into two or more subnetworks, such as by network address. The subnetwork can be as small as one IP address, such as to protect a single workload.

The network can be hardwired, for example, using cable media such as wires and optical fibers (e.g., a local area network (LAN) such as Ethernet). The network can also include wireless connections between devices, such as a wireless LAN (WLAN, e.g., Wi-Fi or WiMAX) or cellular (e.g., CDMA or GSM). The network can also be a combination of wired and wireless links between devices.

The different hardware devices illustrated in FIG. 1 can include multiple computing devices having one or more processing units (e.g., one or more microprocessors, digital signal processors (DSPs), application-specific processing units, to name a few) and memory devices (e.g., cache memory, main memory such as random-access memory (RAM), flash and other non-volatile memory, and the like). In different embodiments, these devices can be programmed with executable instructions (such as software or firmware) or otherwise implemented with custom logic (such as a field-programmable gate array (FPGA) or application-specific integrated circuit (ASIC)) that configure the devices to implement the various network segmentation and firewall management functions further described herein.

Network security for the data center 100 between subnetworks is provided by a physical firewall 190 (such as a firewall appliance) together with virtual firewalls 150 and 160. Virtual firewall 150 runs as a virtual appliance on host server 130 while virtual firewall 155 runs as a virtual appliance on host server 135. Overseeing the network security is a firewall management device 110 (such as a server or appliance) that manages the different physical and virtual firewalls of the network. Part of this management includes monitoring all the physical and virtual firewalls in the network, and deciding which firewall should be used for the east-west traffic between two servers in different subnetworks of the data center 100 (such as the nearest firewall to one or both of the two servers, or the least busy firewall, to name a few).

Firewalls monitor incoming and outgoing traffic to and from the data center 100 (or to and from the subnetworks of the data center 100). The firewalls include both physical firewalls and virtual firewalls. The physical and virtual firewalls can be one or more of many kinds of firewalls. These kinds of firewalls include packet filters (at the network layer, including stateful firewalls and stateless firewalls), circuit level filters (at the transport layer), and application level filters (proxy filters, at the application layer). Multiple kinds of firewalls can be combined to provide more effective security, albeit with more overhead and slower performance for the network communication. Different vendors supply different firewalls with different capabilities. In an embodiment, to simplify implementation and management, for example, the physical and virtual firewalls are supplied by the same vendor.

The physical and virtual firewalls are managed by the firewall management device 110. In an embodiment, firewall management policies are administered (e.g., maintained) by the firewall management device 110 and carried out by the various physical and virtual firewalls. These policies include restrictions, for example, on which ports, network addresses, locations, applications, traffic type, and the like, can or cannot pass through the different physical and virtual firewalls that make up the data center's network security. The security controls can be adjusted dynamically, such as in automated response to network traffic behavior or in response to received requests from a trusted source. In addition, the adjustments can be distributed by the firewall management device 110 to each of the physical and virtual firewalls. The firewall management device 110 also monitors the activity of each of the physical and virtual firewalls. From this monitoring, the firewall management device 110 makes further adjustments, such as to the firewall management policies or to the assignment of physical and virtual firewalls to various pairs of communicating servers across the subnetworks that make up the data center network.

Although the various physical and virtual firewalls been described as performing certain security controls, additional or alternative security controls can be performed on the data center network traffic. In particular, the described security controls perform in several of the Open Systems Interconnection (OSI) model layers, which include: layer 7—application layer; layer 6—presentation layer; layer 5—session layer; layer 4—transport layer; layer 3—network layer; layer 2—data link layer; and layer 1—physical layer. In other embodiments, security controls for the firewalls are placed in the same or others of these OSI model layers.

It should be noted that while virtual servers 140 and 145 are shown in FIG. 1 as running on different host servers 130 and 135, in another embodiment, two (or more) virtual servers run in different subnetworks on the same host server. In this case, the multiple virtual servers can share the same virtual firewall running as a virtual appliance on the same host server as the virtual servers. As such, the two virtual servers can do east-west traffic between themselves using the virtual firewall; all this activity takes place on the same host server. Further, in some embodiments, some of the host servers themselves are virtualized, running as virtual machines (virtual servers) under a physical hardware host server.

In an embodiment, the firewall management device 110 monitors the network traffic between servers of the data center 100, and decides which firewall to direct the traffic through based on the types (e.g., physical and/or virtual) of servers sending and receiving the traffic. That is, the firewall management device 110 decides which firewall to use depending on the type of the east-west data center network traffic. For example, consider when workloads from two physical servers ("physical workloads"), such as bare-metal server 120 and bare-metal server 125, are communicating over the network. In this case, the firewall management device 110 configures the network segmentation to use a physical firewall, such as physical firewall 190. This is illustrated in FIG. 1 as the path labeled ① ("1") connecting bare-metal server 120 to bare-metal server 125 via physical firewall 190. Here, the SDN technology directs the traffic between bare-metal servers 120 and 125 through physical firewall 190. In an embodiment, when there are two or more physical firewalls to choose from, the firewall management device 110 directs the traffic through the nearest physical firewall (e.g., nearest to the sending or receiving physical server).

Now consider when workloads from two virtual servers ("virtual workloads"), such as virtual server 140 and virtual server 145, are communicating over the network. Here, each virtual server 140 and 145 is running on a different corresponding host server. In this case, the firewall management device 110 configures the network segmentation to use a virtual firewall in one of the two host servers, such as virtual firewall 150. This is illustrated in FIG. 1 as the path labeled ② ("2") connecting virtual server 140 to virtual server 145 via virtual firewall 150. In another virtual workload scenario, the two virtual servers are running on the same host server but in different subnetworks, and communicate to each other through a virtual firewall running on the same host server. For each of these virtual workload scenarios, the virtual SDN technology or the hypervisor directs the traffic between virtual servers (such as virtual servers 140 and 145) through a virtual firewall (such as virtual firewall 150). In an embodiment, when there are two or more virtual firewalls to choose from, the firewall management device 110 directs the traffic through the nearest virtual firewall (e.g., nearest to the sending or receiving virtual server).

As another option, consider when workloads are communicating between a physical server and a virtual server ("mixed workloads," or "physical and virtual workloads"), such as between virtual server 140 and bare-metal server 120. In this case, the choice of whether to use a physical firewall (such as physical firewall 190) or a virtual firewall (such as virtual firewall 150) depends on which server is sending the communication and which server is receiving the communication. If the virtual server (such as virtual server 140) is sending to the physical server (such as bare-metal server 120), the firewall management device 110 configures the network segmentation to use a virtual firewall, such as virtual firewall 150. Here, the virtual firewall runs on the same hypervisor (or host server) as the virtual server. The virtual SDN technology or the hypervisor directs the traffic from virtual server 140 to bare-metal server 120 through virtual firewall 150. In an embodiment, when there are two or more virtual firewalls to choose from, the firewall management device 110 directs the traffic through the nearest virtual firewall (e.g., nearest to the sending virtual or receiving physical server, such as on the same host server as the virtual server).

On the other hand, in the mixed workload case, if the physical server (such as bare-metal server 120) is sending to the virtual server (such as virtual server 140), the firewall management device 110 configures the network segmentation to use a physical firewall, such as physical firewall 150. This is illustrated in FIG. 1 as the path labeled 0 ("3") connecting bare-metal server 120 to virtual server 140 via physical firewall 190. Here, the (hardware) SDN technology directs the traffic from bare-metal server 120 to virtual server 140 through physical firewall 190. In an embodiment, when there are two or more physical firewalls to choose from, the firewall management device 110 directs the traffic through the nearest physical firewall (e.g., nearest to the sending physical or receiving virtual server).

To implement these different techniques of network segmentation, the firewall management device 110 uses a real-time network analysis solution to have visibility into the different types of network traffic and provide suggested policies. In an embodiment, the firewall management device 110 collects information from all firewalls, physical and virtual. In addition, the firewall management device 110 has a repository of all network flows over a period of time where analysis of applications' behavior can be conducted. The firewall management device 110 also has control of physical and virtual firewalls from a centralized console. The firewall management device 110 further has a holistic overview and control of all security polices including both virtual and physical workloads. For example, in an embodiment, the firewall management device uses a trusted certificate to authenticate with the physical and virtual firewalls. In addition, the firewall management device 110 is part of the control plane. As such, even if the control plane is down, there is no impact on the data plane, that has enough intelligence about the applied logics.

FIG. 2 is a flow chart of an embodiment method 200 for data center network segmentation, such as for the data center 100 of FIG. 1, according to the present disclosure. This and other methods disclosed herein can be performed on a firewall management device, such as the firewall management device 110 of FIG. 1. The firewall management device can be, for example, a dedicated hardware appliance or bare-metal server, or a portion of a hardware server or computer system. The firewall management device can include a non-transitory computer readable medium (CRM, such as read-only memory (ROM), flash drive, or disk drive)

storing instructions that, when executed on one or more processors of the firewall management device, cause the method 200 (or other disclosed method) to be carried out. It should be noted that in other embodiments, the order of the operations can be varied, and that some of the operations can be omitted.

The data center includes physical and virtual servers (at least one of each type), physical and virtual firewalls (at least one of each type), and a network configured to connect the servers using software-defined networking (SDN). The network is arranged in subnetworks, for segmenting the data center network. Each such subnetwork can be small, such as a single workload. Processing begins for method 200 with detecting 210 traffic over the network between two servers in different subnetworks from among the physical and virtual servers. Method 200 further includes determining 220 the types of the two servers (such as both are physical servers, both are virtual servers, or one is a physical server and the other is a virtual server).

In response to determining 230 the two servers are physical servers (such as bare-metal servers 120 and 125), method 200 further includes using 240 the SDN to direct the traffic through a physical firewall (such as physical firewall 190). In response to determining 250 the two servers are virtual (such as virtual servers 140 and 145), method 200 further includes using 260 the SDN to direct the traffic through a virtual firewall (such as virtual firewall 150). In response to determining 270 the two servers include a physical server and a virtual server, with the physical server sending to the virtual server (such as from bare-metal server 120 to virtual server 140), method 200 further includes using 280 the SDN to direct the traffic through a physical firewall. Otherwise, the virtual server is sending to the physical server, and method 200 further includes using 290 the SDN to direct the traffic through a virtual firewall.

It should be understood that various combination, alternatives, and modifications of the present disclosure could be devised by those skilled in the art. The present disclosure is intended to embrace all such alternatives, modifications, and variances that fall within the scope of the appended claims.

It should be understood that embodiments of the present disclosure may be implemented by software, by hardware, or by any combination of software and/or hardware as may be appropriate for specific applications or design requirements. In some embodiments, the system of the disclosure can further include general, multi-purpose and/or specific processors, circuits, logic systems, operators, circuitry, blocks, units, and/or sub-units that can perform any operation, or any combination of operations, described above.

In some embodiments of the disclosure, the system can further include memory units, buffers, and/or registers for temporary and/or permanent storage of data. These units (e.g., processor and memory units), or any combination thereof, can be referred to herein as "circuitry," and can be internal and/or external to a communication node, in whole or in part. Accordingly, embodiments of the disclosure can include an article comprising a storage medium (such as a non-transitory storage medium) having stored thereon instruction that, when executed by a processing device, perform the operations of the network segmentation for a data center in accordance with the disclosed embodiments.

The flowchart and block diagrams in the figures illustrate the architecture, functionality, and operation of possible implementations of systems, methods, and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order from that noted in the figures. For example, two blocks shown in succession may, in fact, be executed substantially concurrently, or the blocks may sometimes be executed in an alternative order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be further appreciated that more or fewer operations can be performed than shown in the figures and described. It is to be understood that like numerals in the drawings represent like elements through the several figures, and that not all components and/or operations described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

It is to be understood that any structural and functional details disclosed herein are not to be interpreted as limiting the systems and methods, but rather are provided as a representative embodiment and/or arrangement for teaching one skilled in the art one or more ways to implement the systems and methods. Descriptions of well-known components (such as an Ethernet network infrastructure) and processing techniques may be omitted for ease of understanding the embodiments of the disclosure. It is to be further understood that like numerals in the drawings represent like elements through the several figures, and that not all components and/or operations described and illustrated with reference to the figures are required for all embodiments or arrangements.

While the invention which is the subject of the present disclosure has been particularly shown and described with reference to certain embodiments thereof, it will be understood by those skilled in the art that various changes in form and details may be made therein without departing from the spirit and scope of the invention. Therefore, the scope of the invention is indicated by the appended claims, rather than by the foregoing description. All changes that come within the meaning and range of equivalency of the claims are to be embraced within their scope.

What is claimed is:

1. A method for network segmentation of a data center, the data center comprising servers and firewalls of different types, a firewall management device to manage the firewalls, and a network configured to connect the servers using software-defined networking (SDN), the network being arranged in subnetworks, the different types including physical and virtual, the method comprising:

detecting, by the firewall management device, traffic over the network between two servers in different ones of the subnetworks from among the servers;

determining, by the firewall management device, a type of each of the two servers;

in response to a determination that the two server types are physical, using, by the firewall management device, the SDN to direct the traffic through a physical one of the firewalls;

in response to a determination that the two server types are virtual, using, by the firewall management device, the SDN to direct the traffic through a virtual one of the firewalls;

in response to a determination that the two servers comprise a physical server and a virtual server, with the traffic comprising the physical server sending information to the virtual server, using, by the firewall management device, the SDN to direct the traffic through a physical one of the firewalls; and in response to a determination that the two servers comprise the physical server and the virtual server, with the traffic comprising the virtual server sending information to the physical server, using, by the firewall management device, the SDN to direct the traffic through a virtual one of the firewalls, wherein at least one of:

the firewalls comprise two or more physical firewalls, and wherein the firewall management device directs the traffic through a physical one of the firewalls by directing the traffic through a nearest one of the physical firewalls; and the firewalls comprise two or more virtual firewalls, and wherein the firewall management device directs the traffic through a virtual one of the firewalls by directing the traffic through a nearest one of the virtual firewalls.

2. The method of claim 1, further comprising:

maintaining, by the firewall management device, a firewall management policy for controlling network access through the firewalls; and controlling, by the firewall management device, the firewalls in accordance with the firewall management policy.

3. The method of claim 2, further comprising:

monitoring, by the firewall management device, activity of the firewalls, wherein maintaining the firewall management policy comprises adjusting the policy in response to the monitored activity.

4. The method of claim 1, further comprising monitoring, by the firewall management device, activity of the firewalls, wherein at least one of:

the firewalls comprise two or more physical firewalls, and wherein the firewall management device directs the traffic through a physical one of the firewalls by directing the traffic through a different one of the physical firewalls in response to the monitored activity; and the firewalls comprise two or more virtual firewalls, and wherein the firewall management device directs the traffic through a virtual one of the firewalls by directing the traffic through a different one of the virtual firewalls in response to the monitored activity.

5. A firewall management device for network segmentation of a data center, the data center comprising servers and firewalls of different types, a firewall management device to manage the firewalls, and a network configured to connect the servers using software-defined networking (SDN), the network being arranged in subnetworks, the different types including physical and virtual, the firewall management device comprising:

a hardware processor to implement:

logic to detect traffic over the network between two servers in different ones of the subnetworks from among the servers;

logic to determine a type of each of the two servers;

logic to, in response to a determination that the two server types are physical, use the SDN to direct the traffic through a physical one of the firewalls;

logic to, in response to a determination that the two server types are virtual, use the SDN to direct the traffic through a virtual one of the firewalls;

logic to, in response to a determination that the two servers comprise a physical server and a virtual server, with the traffic comprising the physical server sending information to the virtual server, use the SDN to direct the traffic through a physical one of the firewalls; and logic to, in response to a determination that the two server types comprise the physical server and the virtual server, with the traffic comprising the virtual server sending information to the physical server, use the SDN to direct the traffic through a virtual one of the firewalls, wherein at least one of:

the firewalls comprise two or more physical firewalls, and the logic to direct the traffic through a physical one of the firewalls comprises logic to direct the traffic through a nearest one of the physical firewalls; and the firewalls comprise two or more virtual firewalls, and the logic to direct the traffic through a virtual one of the firewalls comprises logic to direct the traffic through a nearest one of the virtual firewalls.

6. The firewall management device of claim 5, further comprising:

logic to maintain a firewall management policy for controlling network access through the firewalls; and logic to control the firewalls in accordance with the firewall management policy.

7. The firewall management device of claim 6, further comprising:

logic to monitor activity of the firewalls, wherein the logic to maintain the firewall management policy comprises adjusting the policy in response to the monitored activity.

8. The firewall management device of claim 5, further comprising logic to monitor activity of the firewalls, wherein at least one of:

the firewalls comprise two or more physical firewalls, and the logic to direct the traffic through a physical one of the firewalls comprises logic to direct the traffic through a different one of the physical firewalls in response to the monitored activity; and the firewalls comprise two or more virtual firewalls, and the logic to direct the traffic through a virtual one of the firewalls comprises logic to direct the traffic through a different one of the virtual firewalls in response to the monitored activity.

9. A non-transitory computer-readable medium (CRM) storing instructions that, when executed on a computer processor of a firewall management device, cause the firewall management device to carry out a process for network segmentation of a data center, the data center comprising servers and firewalls of different types, a firewall management device to manage the firewalls, and a network configured to connect the servers using software-defined networking (SDN), the network being arranged in subnetworks, the different types including physical and virtual, the process comprising:

detecting traffic over the network between two servers in different ones of the subnetworks from among the servers;

determining a type of each of the two servers;

in response to a determination that the two server types are physical, using the SDN to direct the traffic through a physical one of the firewalls;

in response to a determination that the two server types are virtual, using the SDN to direct the traffic through a virtual one of the firewalls;

in response to a determination that the two servers comprise a physical server and a virtual server, with the traffic comprising the physical server sending information to the virtual server, using the SDN to direct the traffic through a physical one of the firewalls; and in response to a determination that the two servers comprise the physical server and the virtual server, with the traffic comprising the virtual server sending information to the physical server, using the SDN to direct the traffic through a virtual one of the firewalls, wherein at least one of:

the firewalls comprise two or more physical firewalls, and wherein the firewall management device directs the traffic through a physical one of the firewalls by directing the traffic through a nearest one of the physical firewalls; and the firewalls comprise two or more virtual firewalls, and wherein the firewall management device directs the traffic through a virtual one of the firewalls by directing the traffic through a nearest one of the virtual firewalls.

10. The CRM of claim 9, wherein the process further comprises:

maintaining a firewall management policy for controlling network access through the firewalls; and controlling the firewalls in accordance with the firewall management policy.

11. The CRM of claim 10, wherein the process further comprises:

monitoring activity of the firewalls, wherein maintaining the firewall management policy comprises adjusting the policy in response to the monitored activity.

12. The CRM of claim 9, wherein the process further comprises monitoring activity of the firewalls, wherein at least one of:

the firewalls comprise two or more physical firewalls, and wherein the firewall management device directs the traffic through a physical one of the firewalls by directing the traffic through a different one of the physical firewalls in response to the monitored activity; and the firewalls comprise two or more virtual firewalls, and wherein the firewall management device directs the traffic through a virtual one of the firewalls by directing the traffic through a different one of the virtual firewalls in response to the monitored activity.

\* \* \* \* \*